(12) United States Patent
Zavesky et al.

(10) Patent No.: US 12,132,634 B2
(45) Date of Patent: Oct. 29, 2024

(54) MANAGING EXTENDED REALITY EXPERIENCE

(71) Applicant: AT&T Intellectual Property I, L.P., Atlanta, GA (US)

(72) Inventors: Eric Zavesky, Austin, TX (US); Wen-Ling Hsu, Bridgewater, NJ (US); Tan Xu, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 324 days.

(21) Appl. No.: 17/507,276

(22) Filed: Oct. 21, 2021

(65) Prior Publication Data
US 2023/0128178 A1    Apr. 27, 2023

(51) Int. Cl.
| | |
|---|---|
| H04L 43/08 | (2022.01) |
| H04L 43/0888 | (2022.01) |
| H04L 43/16 | (2022.01) |
| H04L 67/131 | (2022.01) |
| H04L 67/61 | (2022.01) |
| H04N 13/332 | (2018.01) |

(52) U.S. Cl.
CPC ........ *H04L 43/0888* (2013.01); *H04L 67/131* (2022.05); *H04L 67/61* (2022.05)

(58) Field of Classification Search
None
See application file for complete search history.

(56) References Cited

U.S. PATENT DOCUMENTS

| | | | |
|---|---|---|---|
| 11,483,568 B2 * | 10/2022 | Parks | H04N 21/2402 |
| 11,540,204 B1 * | 12/2022 | Ahmed | H04W 72/0446 |
| 11,789,584 B1 * | 10/2023 | O'Hern | G06F 3/011 |
| | | | 715/850 |
| 11,995,225 B2 * | 5/2024 | Factor | G06F 3/011 |
| 2019/0278697 A1 * | 9/2019 | Sharma | G06F 11/3664 |
| 2021/0158620 A1 * | 5/2021 | Saraf | H04W 48/08 |
| 2021/0185294 A1 * | 6/2021 | Malaika | G06T 7/73 |
| 2021/0233288 A1 * | 7/2021 | Hazen | G06V 40/193 |
| 2022/0171898 A1 * | 6/2022 | Rakshit | G06F 30/20 |
| 2022/0201693 A1 * | 6/2022 | Hwang | H04W 28/0268 |
| 2022/0217560 A1 * | 7/2022 | Kumar | H04W 24/10 |
| 2022/0222888 A1 * | 7/2022 | Kennedy | G06T 15/20 |
| 2023/0054643 A1 * | 2/2023 | Tan | H04L 1/0003 |
| 2023/0057661 A1 * | 2/2023 | Awoniyi-Oteri | H04B 7/063 |
| 2023/0065183 A1 * | 3/2023 | Zirr | G06N 3/04 |
| 2023/0139216 A1 * | 5/2023 | Otsuka | H04N 21/44 |
| | | | 348/39 |

(Continued)

*Primary Examiner* — Duc T Duong
(74) *Attorney, Agent, or Firm* — Guntin & Gust, PLC; Miyoung Shin

(57) ABSTRACT

A method may include receiving current environment condition information associated with an extended reality device; receiving historical environment condition information associated with the extended reality device; based on current environment condition information and the historical environment condition information, determining one or more adjustments to meet a performance threshold for rendering objects on the an extended reality device or using the an extended reality device; and sending instructions to implement the one or more adjustments to meet the performance threshold for rendering objects on the extended reality device or using the extended reality device.

20 Claims, 6 Drawing Sheets

(56) References Cited

U.S. PATENT DOCUMENTS

2023/0298130 A1\* 9/2023 Tamaki ..................... G06F 3/14
                                                    382/305
2023/0351705 A1\* 11/2023 Yip ......................... G06T 19/20
2023/0405454 A1\* 12/2023 Phillips ............... H04L 65/4015

\* cited by examiner

MANAGING EXTENDED REALITY EXPERIENCE

BACKGROUND

Extended reality (XR) is a term referring to all real-and-virtual combined environments and human-machine interactions generated by computer technology and wearables, where the 'X' represents a variable for any current or future spatial computing technologies. It includes representative forms such as augmented reality (AR), mixed reality (MR), or virtual reality (VR) and the areas interpolated among them. The levels of virtuality range from partially sensory inputs to immersive virtuality, also called VR.

XR is a superset which includes the entire spectrum from "the complete real" to "the complete virtual" in the concept of reality-virtuality continuum. Still, its connotation lies in the extension of human experiences especially relating to the senses of existence (represented by VR) and the acquisition of cognition (represented by AR). XR is a rapid growing field being applied in a wide range of ways, such as entertainment, marketing, real-estate, training, and remote work.

This background information is provided to reveal information believed by the applicant to be of possible relevance. No admission is necessarily intended, nor should be construed, that any of the preceding information constitutes prior art.

SUMMARY

The disclosed subject matter may utilize 3D scanning data from XR engagements to determine and address network QoS issues with XR interactions. In an example, an apparatus may include a processor and a memory coupled with the processor that effectuates operations. The operations may include receiving current environment condition information associated with a user equipment; receiving historical environment condition information associated with a user equipment; based on current environment condition information and the historical environment condition information, determining one or more adjustments to meet a performance threshold for rendering objects on the user equipment or using the user equipment; and sending a notification, wherein the notification comprises an indication to implement the one or more adjustments to meet the performance threshold for rendering objects on the user equipment or using the user equipment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

As XR engagements are growing in presence and compute needs, the smoothness of experience may contribute to a good user experience (e.g., the quality of experience—QoE). Drastic gaps between quality of objects (e.g., the resolution or interactivity) or the scene (e.g., effects, rendering delay, or latency during panning) may dramatically hurt user experience and may cause disorientation. Some hybrid rendering systems distribute to both the local device for low latency and a network/cloud device for more powerful compute and detail, but these systems may be fragile and may suffer if parts of the experience (e.g., network quality or quality of service) vary greatly as the user interacts (e.g., following a path in the real and virtual world to arrive at the position of a rendered object). Modern devices capture substantial sensor input (e.g., video, LIDAR, etc.) that can be coupled with network performance to improve the overall experience (e.g., by predictive downgrade or upgrade of quality). Additionally, the ability to semantically carve a scene by the interactive objects and scenes has increased the ability for a rendering engine to attribute quality where needed. However, these semantics are conventionally ignored after initial creation instead of being utilized for precise compute and rendering requirements for the best QoE.

Figure 1:
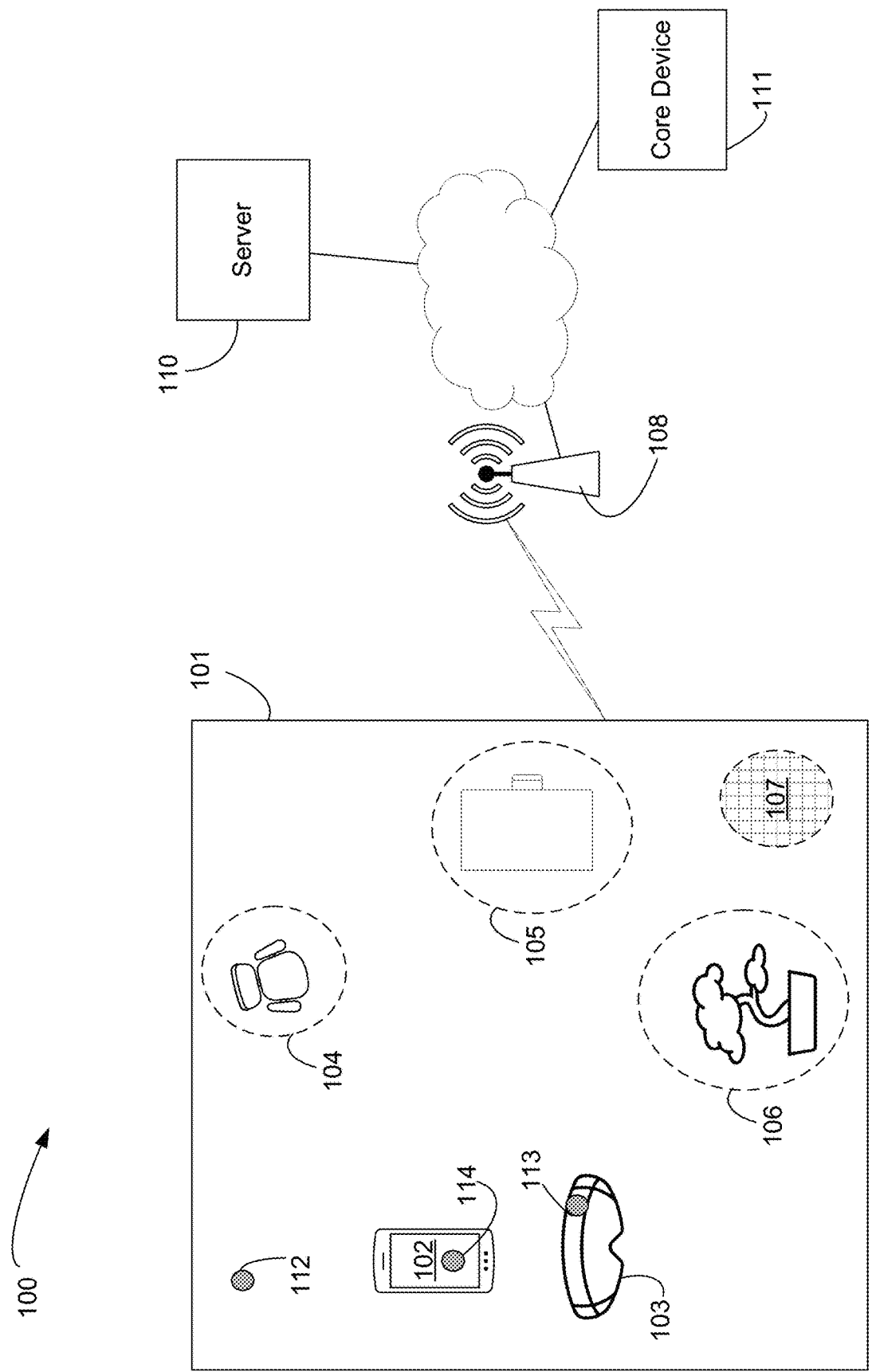
FIG. 1 illustrates an exemplary system for managing XR experience.

FIG. 1 illustrates an exemplary system for managing XR experience, among other things. In system 100, there may be a room 101 that includes one or more devices, such as UE 102 (e.g., a mobile phone) with sensor 114, UE 103 (e.g., VR headset), or sensor 112. Each device of room 101 may be communicatively connected with each other, base station 108, server 110, or core device 111. There may be multiple subareas in room 101, such as subarea 104, subarea 105, subarea 106, or subarea 107, among others, which include objects such as desks, chairs, plants, or the like. The objects may be used by system 100 to help map room 101, in which such map may be used to determine positioning of digital objects in concert with physical objects or limitations that exist in the room. In this example, subarea 107 may be an area that has poor wireless network reception (e.g., a wireless dead spot for LTE, 5G, or WIFI communication) or other issues. These potential dead spots may be directly detected by device UE 102 and sensor 114 or they may be inferred by visual detection (or other 3D sensors) of objects in subareas 105 and 106 that have historically lead to poor performance in adjacent corners.

With continued reference to FIG. 1, server 110 may be a device that helps to manage the XR experience and may receive and process information associated with the local or carrier network, integrated or standalone sensors, user equipment, or the like. Core device 111 may be a mobility management entity (MME), home subscriber server (HSS), serving gateway (SGW), among other things, which may send information to server 110 that may help manage the XR experience.

Figure 2:
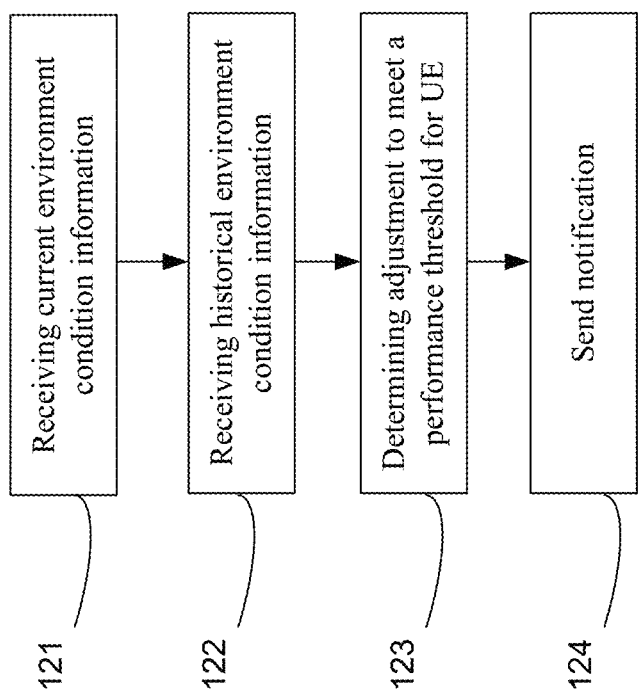
FIG. 2 illustrates an exemplary method for managing XR experience.

FIG. 2 illustrates an exemplary method for managing XR experience. At step 121, server 110, which may be called a quality of experience (QoE) manager, may receive current environment condition information associated with UE 103. The period for the current environment may be proximate (e.g., within 60 seconds) to the time UE 103 powers on or a particular application of UE 103 is executed (e.g., a game is started). The current environment condition information may include communication network information, user equipment information, sensor information, application information of the user equipment, or quality of experience information, among other information. Communication network information may include signal-to-noise ratio (SNR), transmit power, or quality of service, among others. User equipment information may include memory, graphics processor, central processor, software version, or the like. Sensor information may include information from sensors that detect a physical presence (e.g., physical obstacles made of wood, flame, metals, leaks, or levels), detect physical properties (e.g., temperature or pressure), or detect motion or proximity. Application information may include type of application (e.g., shooter game, puzzle game, adventure game, expected virtual objects count and their typical mobility, etc.), area of movement for the application (e.g., miles, feet, or inches), minimum memory usage for the application, or minimum processing power for the application, among other things. Quality of experience information may be obtained from surveys (e.g., ratings) from a user or indirectly based on time of use of an application, lack of use of application, or coinciding technical issues, such as jitter, lag, motion to photon latency, or the like. It is contemplated that these different areas of information may overlap.

At step 122, server 110 may receive historical environment condition information associated with UE 103. The period for the historical environment may be a previous day, week, month, or the like, of use of UE 103 (or similarly situated UEs). The historical environment condition information may include communication network information, user equipment information, sensor information, application information of the user equipment, or quality of experience information, among other information. Other historical information may include maps of the room (physical definitions of the space), the objects and obstacles within it (e.g., desks, chairs, plans, doors), and properties of the materials and surfaces within the room (e.g., reflective glass, metallic or chrome surfaces, thick sound or visual absorbing carpet, etc.). The historical environment condition information may consider the median, mean, mode, similar time of day, etc. of the aforementioned categories of information.

At step 123, server 110, based on the current environment condition information and the historical environment condition information, may determine one or more adjustments to meet a performance threshold for using the user equipment. The performance threshold may be based on one or more factors associated with the environmental condition information, such as minimum quality of service, maximum processer usage percentage, maximum memory usage, minimum signal strength, minimum bandwidth usage, or the like. The use of UE 103 may include the type of application allowed to be used with UE 103, the positions in room 101 in which UE 103 should be located (e.g., not rendering in subarea 107, but rendering in subarea 106), the interactions with other devices to execute the application on UE 103 (e.g., interact with additional devices to obtain compute resources), or the like.

At step 124, server 110 may send a notification that includes an indication to implement the one or more adjustments to meet the performance threshold for using the user equipment. Although server 110 is indicated as performing step 121-step 124, it is contemplated herein that the steps may be executed on one or more devices throughout the network.

Figure 3:
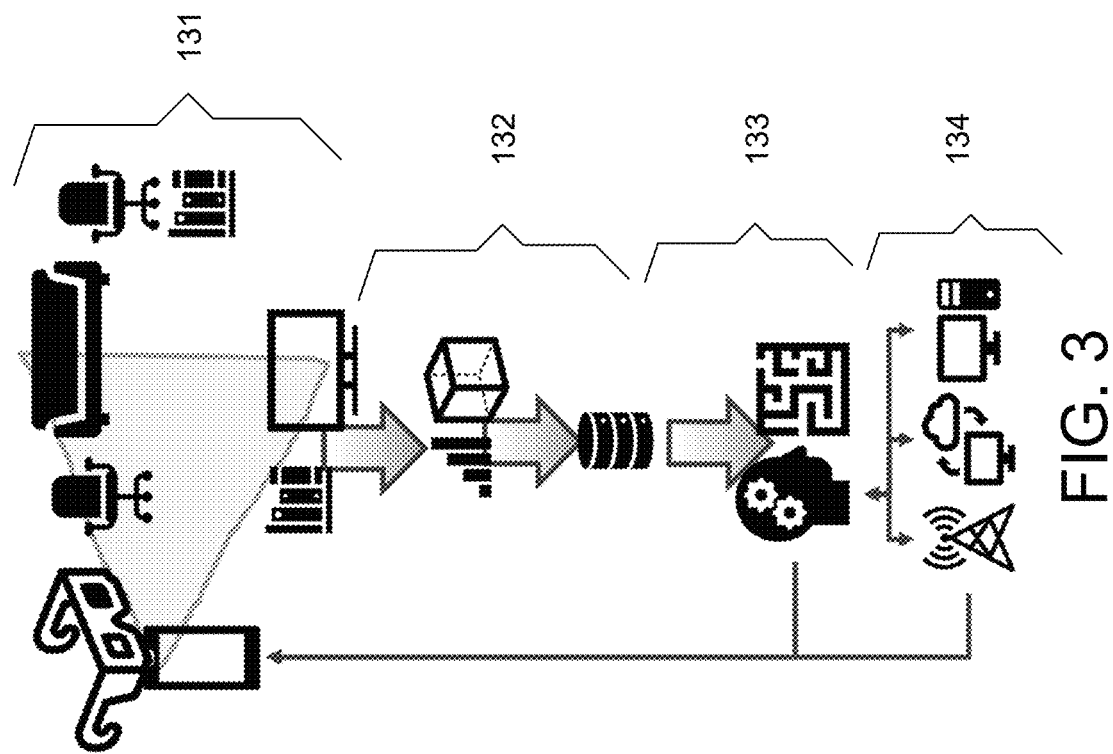
FIG. 3 illustrates an exemplary pictorial method for managing XR experience.

FIG. 3 illustrates an exemplary pictorial method for managing XR experience. At step 131, a local environment (e.g., room 101) may be scanned to obtain information using integrated or external sensors to UE 103. At step 132, based on this scan, the current conditions of the local environment may be obtained. There may be a determination of obstacle and signal estimates by spatial location. At step 133, there may be an update of XR and render stack planning. At step 134, based on the planning of step 133, the resources may be adjusted to implement the applications of UE 103 at a the desired performance threshold.

Figure 4:
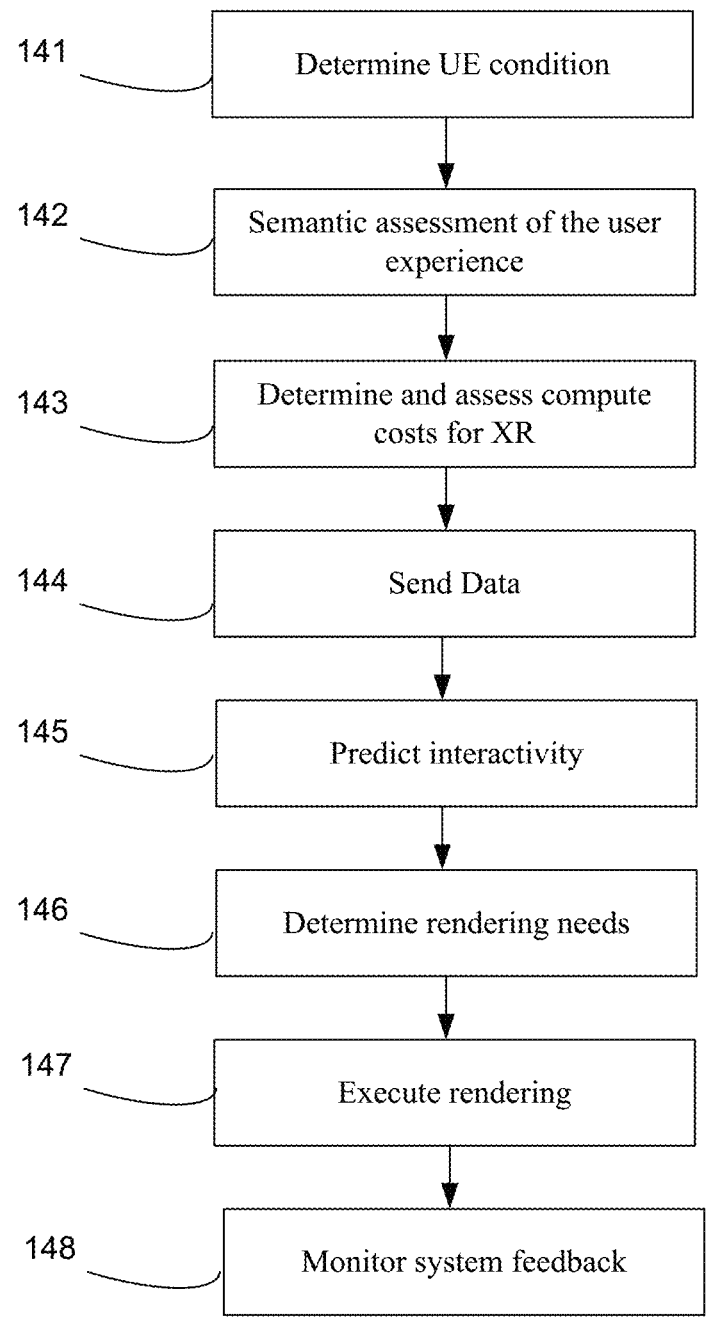
FIG. 4 illustrates an exemplary method for managing XR experience.

FIG. 4 illustrates an exemplary method for managing XR experience. At step 141, determine network conditions for UE 103, base station 108, or other network devices. At this stage, information may be received from/sent to/observed at UE 103 or local signal quality may be observed from base station 103 and within the network of the communications provider. The conditions may be aggregated for server 110 (which may include a QoE engine) to begin computation.

At step 142, there may be semantic assessment of the user experience. The assessment may be determined from a designed scene (e.g., predetermined scene) that allows injection of importance of an object or scene (e.g., expected importance to the user or the narrative). The user may attempt to touch the object that may be used in a game or other application in order to understand the environment condition. Here, there may be a loading of historical examples general models performance (e.g., similar UEs to UE 103), such as SNR characteristics, or specific to UE 103.

At step 143, based on step 142 results, determine and assess compute costs for XR. Server 110 may aggregate available network edge compute services, assess local compute quality for XR experience, or capabilities for local devices that can assist with remote render or hybrid render, or determine the current load and cost of different rendering capabilities (e.g., memory, speed, and latency for the target).

At step 144, volumetric data or sensor data may be sent to server 110. Volumetric data is typically a set S of samples (x, y, z, v), representing the value v of some property of the data, at a 3D location (x, y, z). Sensor data may include information from LIDAR or like technologies. Server 110 may retrieve network and signal impact of historical objects like those in local environment (e.g., certain objects may have reflective or other structured materials that cause signal degradation).

At step 145, determining (e.g., predicting) user interactivity using UE 103. Here the prediction capability there are multiple predictions happening, such 1) in the game (e.g., where is the user going to walk next, what are they going to look at), and 2) for an implementation (e.g., cloud or device implementation of the game). Here, there may be an assignment of the semantic interactions needed or correlation to XR engine (or game engine) and predictions. In addition, there may be a determination of whether there may need to be a handoff between networks. For example, should there be a handoff between cellular to WIFI or a handoff between different base stations (which may by quicker or slower than usual) based on signaling, bandwidth, or the like needs.

At step 146, determining (e.g., predicting) future rendering needs. In an example, there may be modeling and predicting signal (e.g., QoS) map and aligning it to best trajectory (to guide XR engine) for a fixed timespan (e.g., 1 to 2 seconds or other period). An altered rendering topology may be proposed for a hybrid model. In addition, an alternate navigation or procedurally generated path or object may be proposed. There may be a determination to decrease quality of the rendered scene or a rendered object. So, the game executing on UE 103 may provide instructions to use different objects or scenes (e.g., a first monster instead of a second monster) or reduce the activity of the objects or scenes (e.g., instead of jumping, running, and scaring maybe just sits and is more docile). The disclosed subject matter may push actions back to the game in a way that a user may never know there was degraded network or other hardware performance. Unlike the disclosed subject matter, conventional systems may actually show a degraded performance and therefore degraded user experience.

At step 147, execute the rendering. At step 148, monitor system for feedback. Metrics may be recorded from sensor data, application usage, application ratings by the user, or the like. The system feedback may be fed into the system to update models as needed.

The disclosed subject matter provides for a method that may improve a user's quality of experience (QoE) by uniquely utilizing 3D scanning data from XR engagements to determine network QoS issues. Quality of service (QoS) may be increased by instructing the rendering stack to restructure as needed between cloud, edge, or local resources to best serve the user needs. The disclosed uses of 3D data in user's physical environment for network quality impact assessment (e.g., a column, couch, or wall; non reflective materials, opaque glass, or thick tables) may adversely affect the service. A cost may be assigned for QoE/QoS to each of the objects, effects, or scene components. As such, the cost may be used to bootstrap priority of an object (e.g., a critical actor or effect in the scene).

Figure 5:
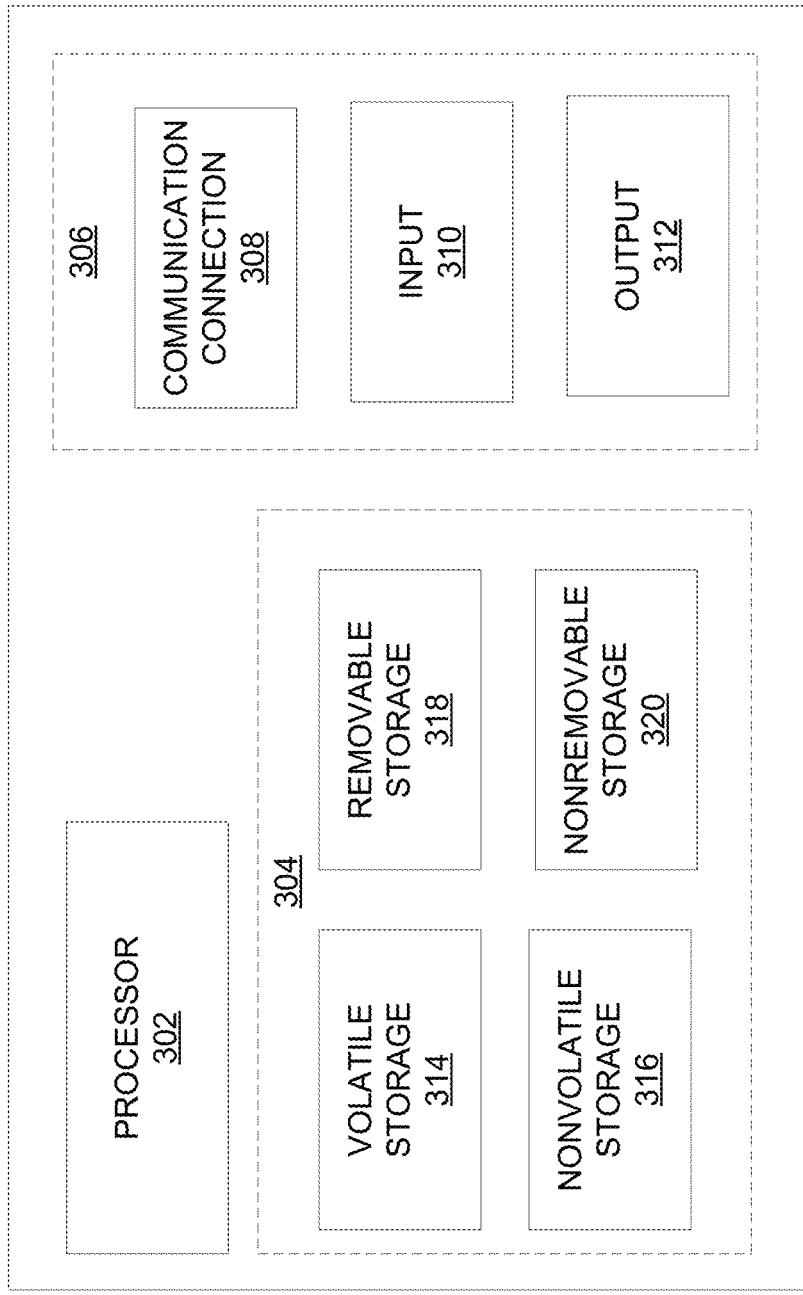
FIG. 5 illustrates a schematic of an exemplary network device.

FIG. 5 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
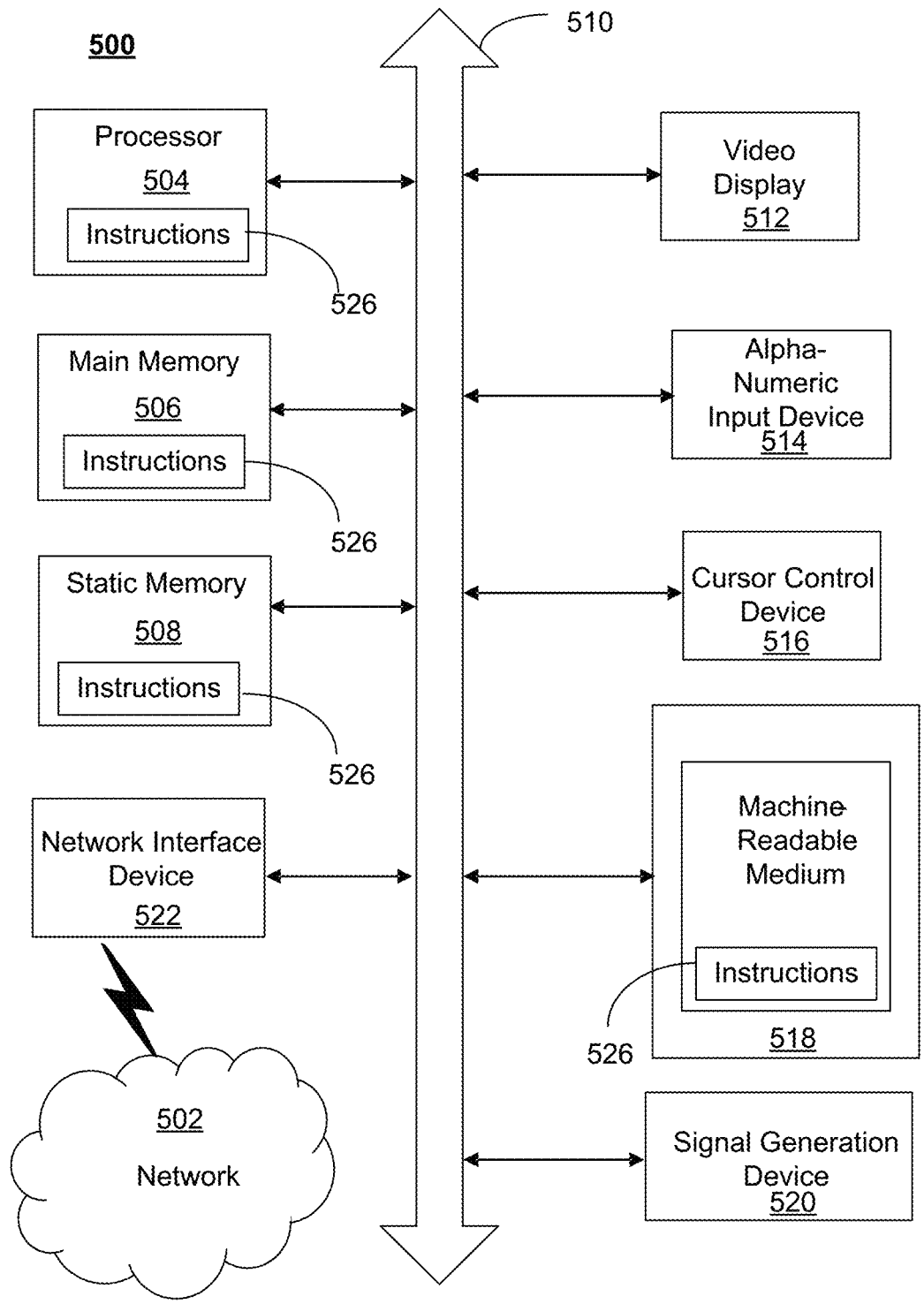
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 102, UE 103, server 110, core device 111, base station 108, sensor 112, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which managing XR experience alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—managing XR experience—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for means for managing or operating XR equipment. A method, system, computer readable storage medium, or apparatus provides for receiving current environment condition information associated with a user equipment, wherein the current environment condition information comprises communication network information, user equipment information, sensor information, application information of the user equipment, or quality of experience information; receiving historical environment condition information associated with a user equipment, wherein the historical environment condition information comprises communication network information, user equipment information, sensor information, application information of the user equipment, or quality of experience information, based on current environment condition information and the historical environment condition information, determining one or more adjustments to meet a performance threshold for rendering or using the user equipment, wherein the performance threshold comprises quality of experience during a current period; and sending a notification, wherein the notification comprises an indication to implement the one or more adjustments to meet the performance threshold for rendering objects on the user equipment or using the user equipment. The environment condition information may be obtained from one or more sensors of network equipment, one or more sensors near user equipment, or network equipment. The one or more adjustments may include creating a rendering at a first position (e.g., location) based on the user equipment being within a historical performance threshold along an anticipated path to the first position. The communication network information may include quality of service information, radio signaling information, interference, or the like. The one or more adjustments may include creating a rendering of a first type instead of a second type at a first position based on the user equipment being within a historical performance threshold along an anticipated path to the first position. The user equipment information may include resources such as a virtual computer processing unit (vCPU), a network interface card (NIC), or computer memory. The user equipment is an extended reality device. A method may include receiving current environment condition information associated with an extended reality device; receiving historical environment condition information associated with the extended reality device; based on current environment condition information and the historical environment condition information, determining one or more adjustments to meet a performance threshold for rendering objects on the an extended reality device or using the an extended reality device; and sending instructions to implement the one or more adjustments to meet the performance threshold for rendering objects on the extended reality device or using the extended reality device. All combinations in this paragraph (including the removal or addition of steps) are contemplated in a manner that is consistent with the other portions of the detailed description.

What is claimed:

1. A method comprising:
receiving current environment condition information associated with a user equipment, wherein the current environment condition information comprises communication network information, user equipment information, sensor information, application information of the user equipment, or quality of experience information;
receiving historical environment condition information associated with a user equipment, wherein the historical environment condition information comprises communication network information, user equipment information, sensor information, application information of the user equipment, or quality of experience information,
based on the current environment condition information and the historical environment condition information, determining one or more adjustments to meet a performance threshold for using the user equipment, wherein the performance threshold comprises quality of experience during a current period; and
sending a notification, wherein the notification comprises an indication to implement the one or more adjustments to meet the performance threshold for using the user equipment; and
wherein the one or more adjustments comprise creating a rendering at a first position based on the user equipment being within a historical performance threshold along an anticipated path to the first position.

2. The method of claim 1, wherein the user equipment is an extended reality device.

3. The method of claim 1, wherein the communication network information comprises a signal-to-noise ratio, the user equipment information comprises memory usage or processor usage; and the sensor information is from sensors integrated in the user equipment.

4. The method of claim 1, wherein the one or more adjustments further comprise creating a rendering of a first type instead of a second type at the first position based on the user equipment being within the historical performance threshold along the anticipated path to the first position.

5. The method of claim 1, wherein the communication network information comprises a signal-to-noise ratio.

6. The method of claim 1, wherein the user equipment information comprises memory usage or processor usage.

7. The method of claim 1, wherein the sensor information is from sensors integrated in the user equipment.

8. The method of claim 1, wherein the communication network information comprises quality of service.

9. The method of claim 1, wherein the one or more adjustments further comprise creating a rendering in a position that maintains a minimum signal strength when the user equipment moves along a path toward the rendering.

10. An apparatus comprising:
a processor; and memory coupled with the processor, the memory storing executable instructions that when executed by the processor cause the processor to effectuate operations comprising:
  receiving current environment condition information associated with a user equipment, wherein the current environment condition information comprises communication network information, user equipment information, sensor information, application information of the user equipment, or quality of experience information;
  receiving historical environment condition information associated with a user equipment, wherein the historical environment condition information comprises communication network information, user equipment information, sensor information, application information of the user equipment, or quality of experience information,
  based on the current environment condition information and the historical environment condition information, determining one or more adjustments to meet a performance threshold for using the user equipment, wherein the performance threshold comprises quality of experience during a current period; and
  sending a notification, wherein the notification comprises an indication to implement the one or more adjustments to meet the performance threshold for using the user equipment, and
  wherein the one or more adjustments comprise creating a rendering at a first position based on the user equipment being within a historical performance threshold along an anticipated path to the first position.

11. The apparatus of claim 10, wherein the one or more adjustments comprises creating a rendering in a position that maintains a minimum signal strength when the user equipment moves along a path toward the rendering.

12. The apparatus of claim 10, wherein the communication network information comprises a signal-to-noise ratio, the user equipment information comprises memory usage or processor usage; and the sensor information is from sensors integrated in the user equipment.

13. The apparatus of claim 10, wherein the one or more adjustments further comprise creating a rendering of a first type instead of a second type at a first position based on the user equipment being within the historical performance threshold along the anticipated path to the first position.

14. The apparatus of claim 10, wherein the communication network information comprises a signal-to-noise ratio.

15. The apparatus of claim 10, wherein the user equipment information comprises memory usage or processor usage.

16. The apparatus of claim 10, wherein the sensor information is from sensors integrated in the user equipment.

17. The apparatus of claim 10, wherein the communication network information comprises quality of service.

18. A non-transitory computer readable storage medium storing computer executable instructions that when executed by a computing device cause said computing device to effectuate operations comprising:
  receiving current environment condition information associated with a user equipment, wherein the current environment condition information comprises communication network information, user equipment information, sensor information, application information of the user equipment, or quality of experience information;
  receiving historical environment condition information associated with a user equipment, wherein the historical environment condition information comprises communication network information, user equipment information, sensor information, application information of the user equipment, or quality of experience information,
  based on the current environment condition information and the historical environment condition information, determining one or more adjustments to meet a performance threshold for using the user equipment, wherein the performance threshold comprises quality of experience during a current period; and
  sending a notification, wherein the notification comprises an indication to implement the one or more adjustments to meet the performance threshold for using the user equipment, and
  wherein the one or more adjustments comprise creating a rendering at a first position based on the user equipment being within a historical performance threshold along an anticipated path to the first position.

19. The non-transitory computer readable storage medium of claim 18, wherein the user equipment is an extended reality device.

20. The non-transitory computer readable storage medium of claim 18, wherein the one or more adjustments further comprise creating a rendering in a position that maintains a minimum signal strength when the user equipment moves along a path toward the rendering.

* * * * *